Figure 1:
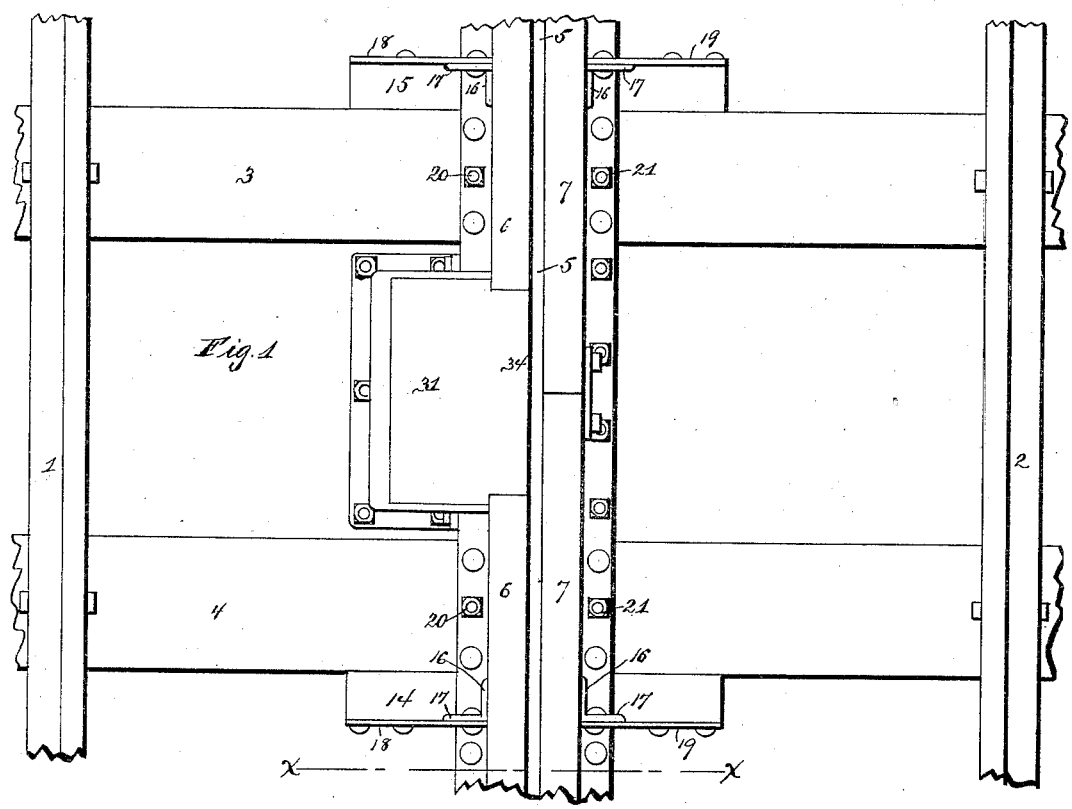

(No Model.) 4 Sheets—Sheet 1.

G. S. MORISON & C. VOGEL.
CONDUIT FOR CABLE OR ELECTRIC TRAMWAYS.

No. 469,262. Patented Feb. 23, 1892.

Witnesses
J. E. Greer
Fred Kemper.

Inventors:
George S. Morison
Charles Vogel
by Gifford Law
Attorneys (No Model.) 4 Sheets—Sheet 2.
G. S. MORISON & C. VOGEL.
CONDUIT FOR CABLE OR ELECTRIC TRAMWAYS.
No. 469,262. Patented Feb. 23, 1892.
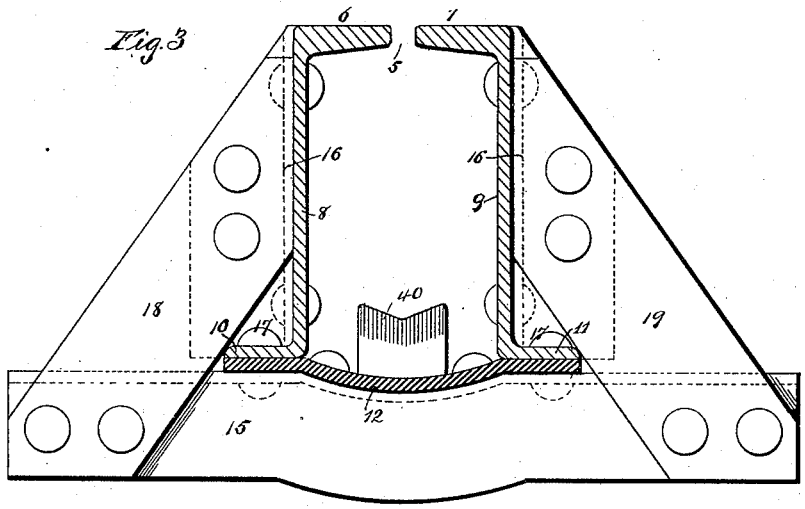
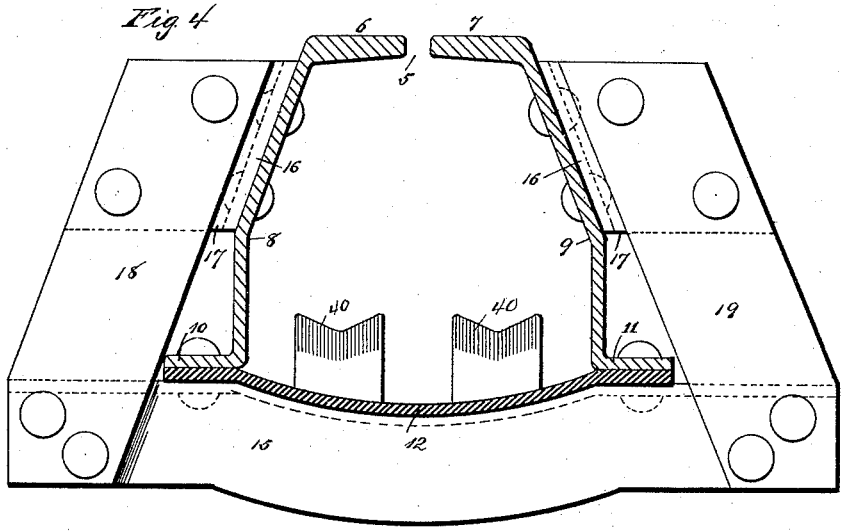
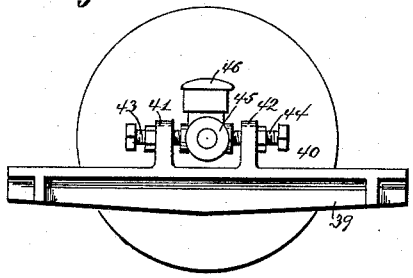

(No Model.) 4 Sheets—Sheet 3.

G. S. MORISON & C. VOGEL.
CONDUIT FOR CABLE OR ELECTRIC TRAMWAYS.

No. 469,262. Patented Feb. 23, 1892.

Witnesses
J. E. Peer
Fred Kemper

Inventors:
George S. Morison
Charles Vogel
By their Attorney
Gifford & Law (No Model.) 4 Sheets—Sheet 4.
G. S. MORISON & C. VOGEL.
CONDUIT FOR CABLE OR ELECTRIC TRAMWAYS.
No. 469,262. Patented Feb. 23, 1892.
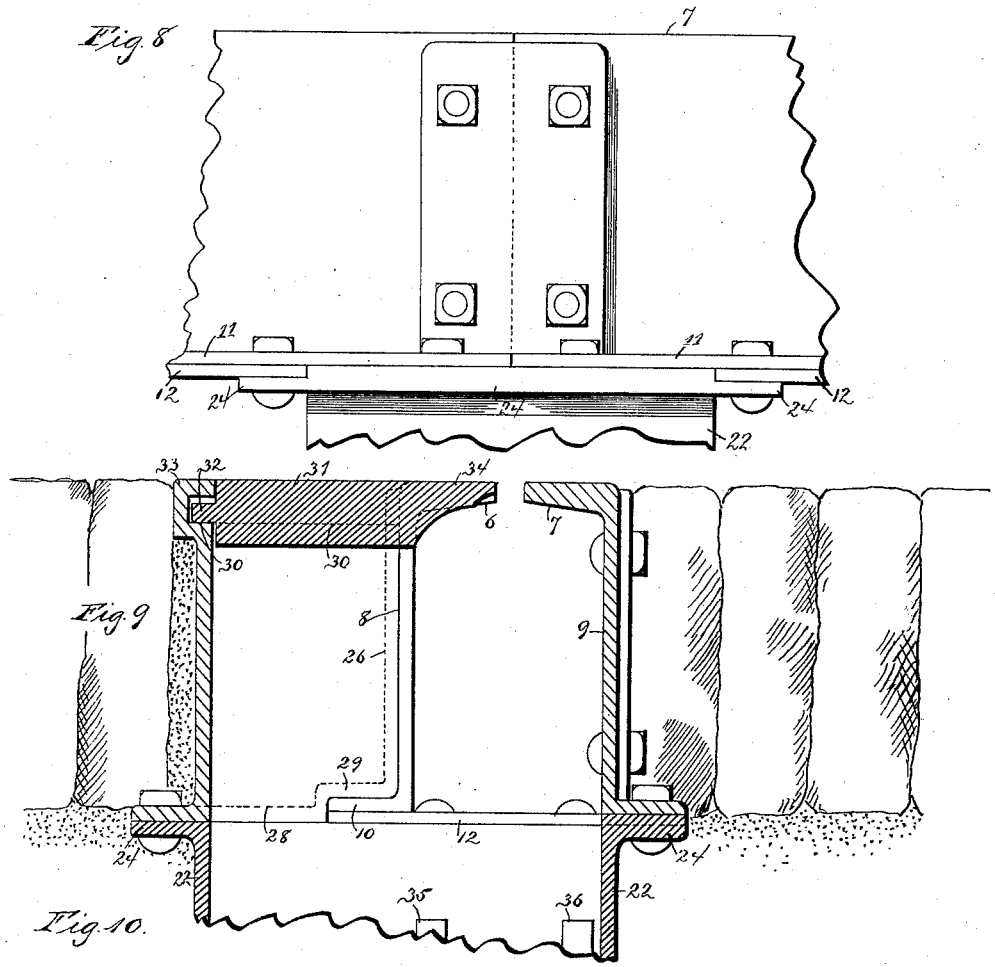
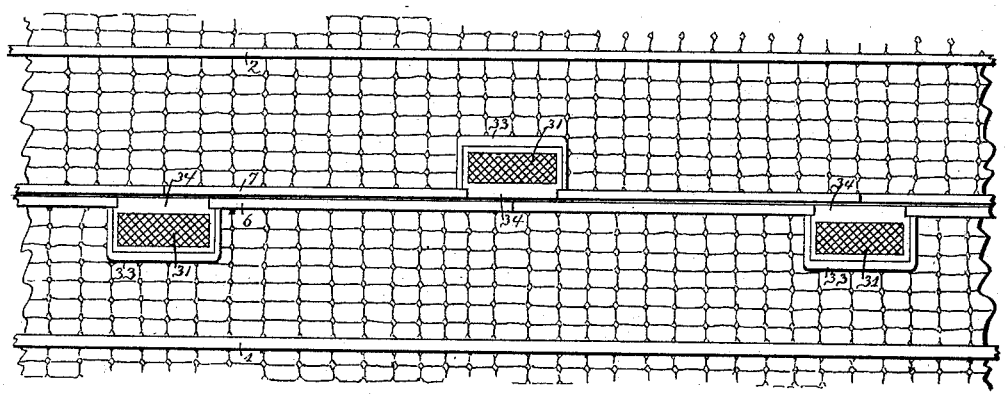
Witnesses
J. E. Greer
Fred Kemper
Inventors:
George S. Morison
Charles Vogel
By their Attorney
Gifford ...

UNITED STATES PATENT OFFICE.

GEORGE S. MORISON, OF CHICAGO, ILLINOIS, AND CHARLES VOGEL, OF SAN ANSELMO, CALIFORNIA, ASSIGNORS TO THE VOGEL CABLE CONSTRUCTION COMPANY, OF COLORADO.

CONDUIT FOR CABLE OR ELECTRIC TRAMWAYS.

SPECIFICATION forming part of Letters Patent No. 469,262, dated February 23, 1892.

Application filed December 29, 1890. Serial No. 376,316. (No model.)

*To all whom it may concern:*

Be it known that we, GEORGE S. MORISON, of Chicago, in the State of Illinois, and CHARLES VOGEL, of San Anselmo, in the State of California, have invented certain new and useful Improvements in Conduits for Cable or Electric Tramways, of which the following is a specification.

A general feature of conduits of this class is the slot or narrow opening at the top through which passes the shank of the grip in a cable railway, or the conducting-bar which forms the contact between the conductor in the street and the motor on a car in an electric railway having an underground conductor. A difficult point in the construction of these conduits is to keep this slot from closing up under the pressure of frost, &c., on the sides of the conduit. Heretofore attempts have been made to accomplish this by braces fastened to the cross-ties or to the rails and to the sides of the conduit.

One feature of our improvement consists in supporting the sides of the conduit by metallic braces in the form of small trusses fastened directly to the conduit itself, making the conduit and its braces complete within itself, so that each section of the conduit may be laid rapidly and require no other connections to be made with the ties than to fasten the conduit to them by ordinary spikes or bolts.

Another feature of the general construction heretofore employed consisted in continuous slot-irons extending the length of the road under which the cable-supporting pulleys were located, making it necessary for the workmen in obtaining access to the pulley to get into the pulley-pit and reach under one of the slot-irons.

Another feature of our improvement consists in making the cover of the pulley-pocket take the place of that portion of one of the slot-irons above the pulley, so that the removal of this cover makes the pulley readily accessible from above.

Another feature of cable-railway conduits in general has been a deep concrete or iron tube supported at intervals by iron yokes. In such cable roads as have been constructed with cross-ties—as, for instance, Vogel and Whelan Patent, No. 358,584—while the slot-irons have been placed on top of ties and the cable has run above the ties, the side pieces were not connected together and a concrete or other drain has been provided under the ties to carry off the drainage.

In our improved form of conduit we secure the side irons together by a cross-plate resting on top of the ties, flat or downwardly curved, making a tight iron tube, by means of which all drainage will be carried to the pulley-pockets, and saving the cost of any excavation below the bottom of the cross-ties, except at the points where the pulley-pockets are located, generally thirty feet apart.

Figure 2:
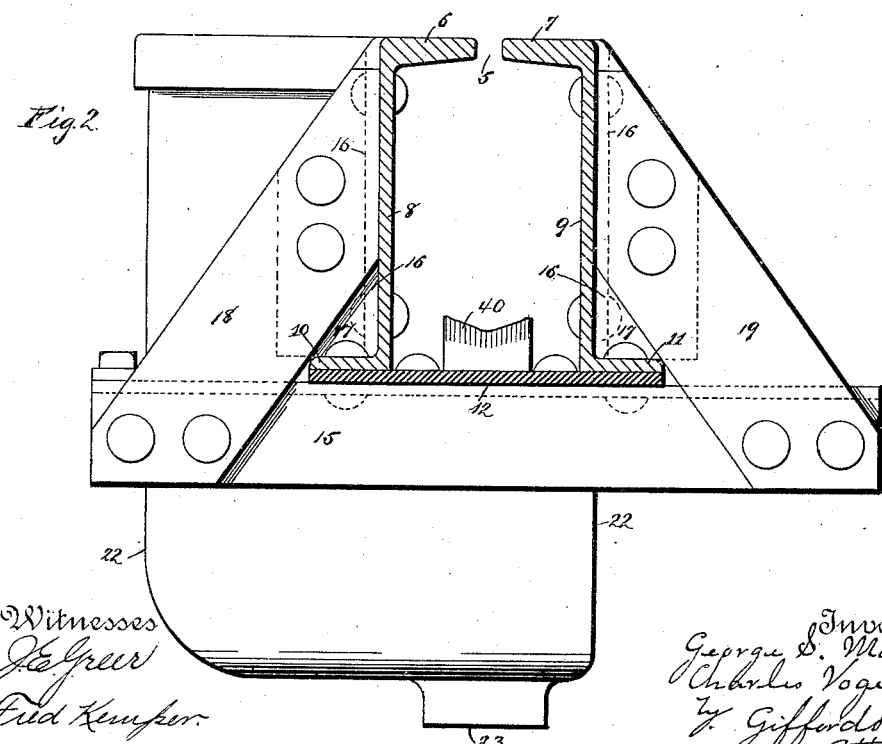
Figure 6:
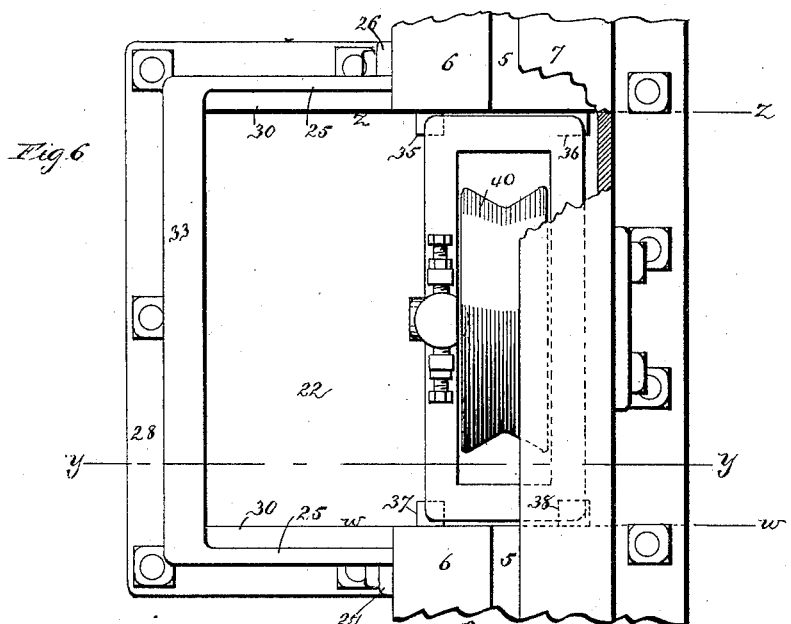
Figure 7:
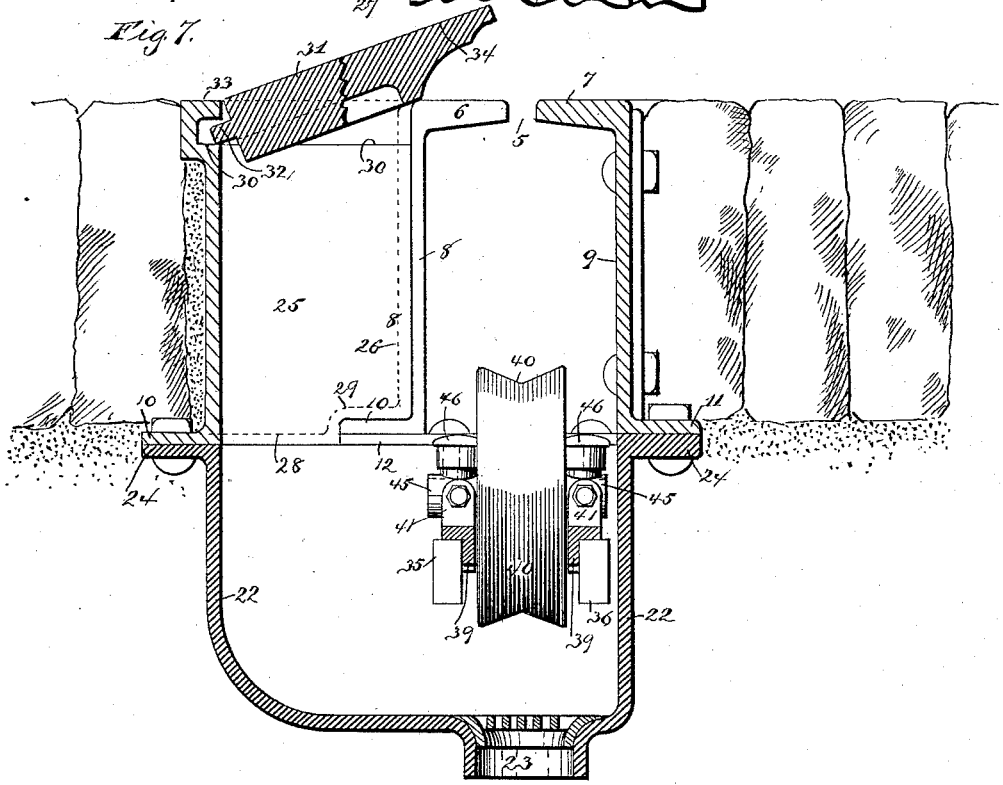

In the accompanying drawings, Figure 1 is a plan view of so much of the road-bed as is necessary to illustrate our improvements. Fig. 2 is a cross-section of the conduit on the line *x x* of Fig. 1. Fig. 3 is a similar cross-section of a slightly-modified form. Fig. 4 is a similar cross-section of an additionally-modified form. Fig. 5 is an axial view of one of the pulleys and its supporting-frame. Fig. 6 is an enlarged plan view of the pulley-pocket with its cover removed. Fig. 7 is a cross-section through the line *y y* of Fig. 6, showing the cover to the pulley-pocket in the act of being removed. Figs. 8 and 9 are details, and Fig. 10 is a diagram illustrating the relative position of the pockets along the conduit.

1 2 are the ordinary rails.

3 4 are the ordinary cross-ties.

5 is the ordinary conduit-slot.

6 7 are the slot-irons.

8 9 are the side irons of the conduit.

10 and 11 are the flanges by which the side irons are secured to the bottom iron 12.

On each side the slot-iron, side iron, and flange are all constructed of one piece of rolled iron or steel in sections of, say, thirty feet each in length. The form may be varied. For example, in Figs. 2 and 3 I have illustrated the ordinary Z-form, whereas in Fig. 4 an angle is introduced at the side, giving the conduit greater width at the bottom to accommodate two cables. The form of the bottom iron may also be varied. For example, in Fig. 2 it is shown as flat, whereas in Figs. 3 and 4 it is given a downward curve, which may be useful in facilitating the drainage of the conduit. To the bottom iron of the conduit is secured a cross-piece of angle-iron 14 15, the form of which may be made to correspond with the bottom iron, as shown, respectively, in Figs. 2, 3, and 4. To each side iron is bolted a vertical piece of angle-iron 16 17. The diagonal plate 18 is secured at one end to the projecting flange 17 and at the other end to the projecting flange 15 on one side of the conduit, and the diagonal plate 19 is secured to the corresponding flanges on the other side of the conduit. When the structure is thus completed, it is only necessary in laying it to fasten the side and bottom pieces to each cross-tie, as by the lag-screws 20 and 21, and we thus have a structure thoroughly braced and strong, which may be completed before being laid and which is self-sustaining independent of the cross-ties.

We will now describe the construction of the pulley-pockets. One of the slot-irons and its connected side iron and flange are stopped off at the lines $z\ z$ and $w\ w$, Fig. 6. A pocket 22 is cast, having a drainage-opening 23 at the bottom and the flange 24 extending around its upper edge. This flange is secured to the under side of the adjacent ends of the bottom plate 12, and also to the under side of the flange 11 between the ends of the bottom plate, the flange 24 being thickened at that point to an extent corresponding with the thickness of the bottom plate, as shown in detail in Figs. 8 and 9. 25 is a bridge-piece, of cast-iron, designed to bridge the opening at the side of the pulley, provided with flanges 26 and 27, by which it is secured to the extremities of the side irons 8, and with a flange 28, which is secured to the top of the flange 24. This flange 28 is rabbeted at 29, so as to overlap the flange 10 of the side irons 8, and the rabbeted portion of the flange 29 is in one piece with the flange 26, as shown in dotted lines in Fig. 9. The top of the bridge-piece 25 is rabbeted all around, as at 30, to provide for the support of the cover 31, the flange 32 of which fits snugly into this rabbet. An overhanging lip 33 is provided on the bridge-piece 25 at the rear of the cover to hold the cover down at that part and to prevent its being removed, except as it is raised at the front edge, as indicated in Fig. 7. Between the adjacent ends of the side irons 6 a nose 34 projects from the cover 31, so as to exactly fill out the space above the pulley left vacant by stopping off the slot-iron. Thus the nose 34 of the cover when in position performs the function of the slot-iron, the whole operating as though the slot-iron were continuous; but when the cover is removed it exposes substantially the whole interior of the pulley-pocket and gives ready access to the pulley from above for any purpose required, thus enabling a much smaller pulley-pocket to be employed than was necessary in the old form of construction.

Within the pulley-pocket 22 are cast four lugs 35, 36, 37, and 38, which serve to support four corners of the frame 39, upon which are mounted the bearings of the pulley 40. We prefer to make the following provision for these bearings at each end of the pulley: Two parallel arms 41 42 project upward from the frame 39 and are pierced by the inversely-operating set-screws 43 44. Between the points of these set-screws is suspended the journal-box 45, provided with the oiler 46. This method of mounting the bearings enables them to be adjusted with great accuracy, and the location of the bearings upon the frame 39, separate from the casting 22, enables the pulley, practically, to be mounted before it is placed in position in its pocket.

In practice the pulley-pockets will be placed alternately on opposite sides of the conduit, as shown in Fig. 10. This arrangement is easily made with the construction of conduit described, because by making all the side irons of equal length and placing them together, so that they overlap each other at opposite ends by one-half the length of a pulley-pocket, and so that the two overlapping ends abut against each other, the sections of the conduit between every two pulley-pockets will be duplicates of each other, only with a reversed arrangement.

In our description we have shown in connection with the conduit the pulleys adapted for a cable tramway; but the necessary apparatus for employing the conduit in connection with an electric railway will be well known to persons skilled in the art without description or illustration.

We claim—

1. A railway-conduit constructed in sections, the side pieces of each section overlapping each other at opposite ends of the sections, whereby when the sections are placed together end to end openings will be left alternately on opposite sides for the pockets, substantially as described.

2. In combination with a railway-conduit having a section removed from its bottom plate and one of its side plates, a pocket bridging the opening beneath and secured to the adjacent ends of said bottom plate, and an inclosure bridging said opening at the side and secured to the adjacent ends of said interrupted side plate and also to said pocket, substantially as described.

3. In combination with the rails and cross-ties, a conduit resting on top of the cross-ties, having its two side pieces secured together independently of the cross-ties, and a series of pulley-pockets attached to the side and bottom of the conduit between the cross-ties, substantially as described.

4. In combination, the bottom plate, the two side plates, one of which is interrupted adjacent to the pulley, the pulley, and an inclosure for said pulley and said opening in the side plate so constructed and arranged that a manhole is provided extending and giving access to the cable and the pulley all the way from the top of the conduit down to below the level of the pulley-bearings, substantially as described.

5. In combination, the pulley, the side plates of the conduit, one of which is interrupted opposite the pulley, an inclosure for said pulley and said opening in the side plate, and an underneath support for the bearing of said pulley, the whole being so constructed and arranged that the said pulley may be lifted from said support upward and laterally into the man-hole provided by said inclosure through the opening provided by the interruption of said side plate, substantially as described.

GEO. S. MORISON.
CHARLES VOGEL.

Witnesses to signature of Geo. S. Morison:
H. D. BUSH,
W. C. PRATT.

Witnesses to signature of Charles Vogel:
E. E. COOVERT,
GEO. N. LEDERLE.